United States Patent
Plihal

(10) Patent No.: US 11,330,808 B2
(45) Date of Patent: May 17, 2022

(54) LURE APPARATUS FOR FISHING AND ASSOCIATED METHODS

(71) Applicant: George Plihal, Miami, FL (US)

(72) Inventor: George Plihal, Miami, FL (US)

(*) Notice: Subject to any disclaimer, the term of this patent is extended or adjusted under 35 U.S.C. 154(b) by 361 days.

(21) Appl. No.: 16/535,594

(22) Filed: Aug. 8, 2019

(65) Prior Publication Data

US 2021/0037800 A1  Feb. 11, 2021

(51) Int. Cl.
*A01K 85/18*  (2006.01)
*A01K 91/04*  (2006.01)

(52) U.S. Cl.
CPC .............. *A01K 85/18* (2013.01); *A01K 91/04* (2013.01)

(58) Field of Classification Search
CPC ................................. A01K 85/18; A01K 95/02
USPC ........................................................ 43/42.09
See application file for complete search history.

(56) References Cited

U.S. PATENT DOCUMENTS

| | | | |
|---|---|---|---|
| 1,948,983 A | | 2/1934 | Danielczuk |
| 2,546,772 A | | 3/1951 | Neff |
| 2,625,767 A | * | 1/1953 | Pokras ................... A01K 85/00 43/42.05 |
| 3,017,307 A | | 1/1962 | Halliburton |
| 3,169,336 A | * | 2/1965 | Pope ...................... A01K 85/00 43/42.28 |
| 4,630,389 A | * | 12/1986 | Higgins ................. A01K 85/01 43/42.22 |
| 4,777,757 A | * | 10/1988 | de Marees van Swinderen .......... A01K 85/01 43/41 |
| D300,344 S | | 3/1989 | Boulette, III et al. |
| 4,831,768 A | * | 5/1989 | Sorace .................... A01K 85/00 43/42.05 |
| 5,113,607 A | * | 5/1992 | Pate ........................ A01K 85/00 43/42.09 |
| 5,167,089 A | * | 12/1992 | Schriefer ............... A01K 85/00 43/42.28 |
| 5,207,016 A | * | 5/1993 | Pate ........................ A01K 85/00 43/42.28 |
| 5,261,181 A | | 11/1993 | Melton |
| 5,301,453 A | * | 4/1994 | Terrill .................... A01K 85/00 43/42.09 |

(Continued)

FOREIGN PATENT DOCUMENTS

| | | | | |
|---|---|---|---|---|
| FR | 3063870 A1 | * | 9/2018 | ............. A01K 85/01 |
| GB | 2448286 A | * | 10/2008 | ............. A01K 85/08 |

(Continued)

*Primary Examiner* — Christopher P Ellis
(74) *Attorney, Agent, or Firm* — Perkins Coie LLP

(57) ABSTRACT

Lure apparatus for fishing and associated methods are disclosed. In some embodiments, the lure apparatus includes (1) a head portion; (2) a tail portion; and (3) an optional weight portion. The head portion and the tail portion are operably engaged. The head portion has a center opening, which enables a fishing line or wire to pass through. The optional weight portion is positioned inside the head portion to adjust the weight of the overall lure apparatus. The head portion has two side openings. The tail portion has two arms, each of which has a protrusion configured to be positioned in a corresponding one of the two side openings of the head portion. Once the two protrusions are positioned in the side openings, the two protrusions engage with the head portion and restrain the tail portion from moving relatively to the head portion.

18 Claims, 7 Drawing Sheets

(56) References Cited

U.S. PATENT DOCUMENTS

| | | | | |
|---|---|---|---|---|
| 5,361,531 A * | 11/1994 | Rodrigues | | A01K 85/00 43/42.09 |
| 5,369,906 A | 12/1994 | Anterni | | |
| 5,490,345 A | 2/1996 | Infinger | | |
| 5,533,296 A * | 7/1996 | Jansen | | A01K 85/00 43/42.05 |
| D376,407 S * | 12/1996 | Friday | | 43/42.28 |
| D377,824 S | 2/1997 | McKeral, Jr. | | |
| D390,622 S | 2/1998 | Wicht | | |
| D404,460 S | 1/1999 | Wicht | | |
| 5,899,015 A * | 5/1999 | Link | | A01K 85/00 43/42.39 |
| 6,061,948 A * | 5/2000 | Boucek | | A01K 85/00 43/42.09 |
| 6,233,863 B1 * | 5/2001 | Dotson | | A01K 85/00 43/42.09 |
| 6,357,167 B1 * | 3/2002 | Bradford | | A01K 85/00 43/42.05 |
| 6,708,442 B2 * | 3/2004 | Kress | | A01K 83/06 43/44.2 |
| 6,898,894 B1 * | 5/2005 | Anderson | | A01K 85/00 43/42.39 |
| 6,922,938 B1 * | 8/2005 | Ciuffo | | A01K 85/00 43/42.15 |
| 7,059,080 B2 * | 6/2006 | Bendel | | A01K 85/16 43/42.11 |
| 8,079,173 B2 * | 12/2011 | Corbitt, III | | A01K 85/00 43/42.36 |
| 8,402,687 B1 * | 3/2013 | Jarrell | | A01K 85/01 43/42.28 |
| 8,484,884 B2 * | 7/2013 | Zuk | | A01K 85/16 43/42.09 |
| 8,910,415 B2 * | 12/2014 | Farr, Jr. | | A01K 85/00 43/42.28 |
| 9,003,689 B1 * | 4/2015 | Rye | | A01K 85/00 43/42.32 |
| D749,691 S * | 2/2016 | Gibson | | D22/144 |
| 9,288,972 B1 * | 3/2016 | Link | | A01K 85/18 |
| 9,485,974 B1 * | 11/2016 | Rye | | A01K 85/00 |
| 9,655,353 B1 * | 5/2017 | Hudson | | A01K 91/06 |
| 10,123,520 B2 * | 11/2018 | Furuya | | A01K 95/00 |
| 10,143,188 B2 * | 12/2018 | Scopelitis | | A01K 83/06 |
| 10,219,496 B2 * | 3/2019 | Gierlich | | B22D 25/02 |
| D858,684 S | 9/2019 | Bianchi | | |
| 10,874,093 B2 * | 12/2020 | League | | A01K 85/12 |
| 11,083,176 B2 * | 8/2021 | Owens | | A01K 85/00 |
| 11,197,468 B2 * | 12/2021 | Fenton | | A01K 85/16 |
| 2006/0016118 A1 * | 1/2006 | Zuk | | A01K 97/06 43/42.09 |
| 2006/0042147 A1 | 3/2006 | Jenkins | | |
| 2009/0119971 A1 * | 5/2009 | Miyasato | | A01K 85/00 43/42.39 |
| 2012/0000111 A1 * | 1/2012 | Griffin | | A01K 85/00 43/42.09 |
| 2012/0023805 A1 * | 2/2012 | Thorne | | A01K 85/14 43/42.53 |
| 2013/0247444 A1 * | 9/2013 | Young | | A01K 85/00 43/42.09 |
| 2017/0188561 A1 * | 7/2017 | Pettet | | A01K 85/005 |
| 2019/0008128 A1 * | 1/2019 | Walsh | | A01K 85/00 |
| 2019/0014761 A1 * | 1/2019 | Rosher | | A01K 85/18 |
| 2019/0053477 A1 * | 2/2019 | Paule | | A01K 85/18 |

FOREIGN PATENT DOCUMENTS

| | | | | |
|---|---|---|---|---|
| GB | 2547185 A * | 8/2017 | | A01K 83/06 |
| KR | 200492317 Y1 * | 9/2020 | | |
| WO | WO-2010131036 A1 * | 11/2010 | | A01K 85/08 |
| WO | WO-2010135780 A1 * | 12/2010 | | A01K 85/18 |
| WO | WO-2015112161 A1 * | 7/2015 | | A01K 85/00 |
| WO | WO 2016/007643 | 1/2016 | | |

\* cited by examiner

LURE APPARATUS FOR FISHING AND ASSOCIATED METHODS

TECHNICAL FIELD

The present technology is directed to an apparatus for fishing. More particularly, some embodiments of the present technology relate to a lure apparatus with an exchangeable tail portion with a skirt portion, enabling a user to exchange the visual presentation of the lure apparatus in an efficient manner.

BACKGROUND

Fishing lures are often shaped like aquatic animals. Sometimes, certain types of lures are particularly attractive to some types of fish. Traditional approaches for changing a lure include untangling or cutting a fishing line, removing a hook attached to the fishing line, untying a knot in the fishing line, etc. The traditional approaches are time consuming and inefficient. Therefore, it would be beneficial to have an improved lure to address the foregoing issues.

BRIEF DESCRIPTION OF THE DRAWINGS

Many aspects of the present technology can be better understood with reference to the following drawings. The components in the drawings are not necessarily to scale. Instead, emphasis is placed on illustrating the principles of the present technology.

DETAILED DESCRIPTION

Figure 1:
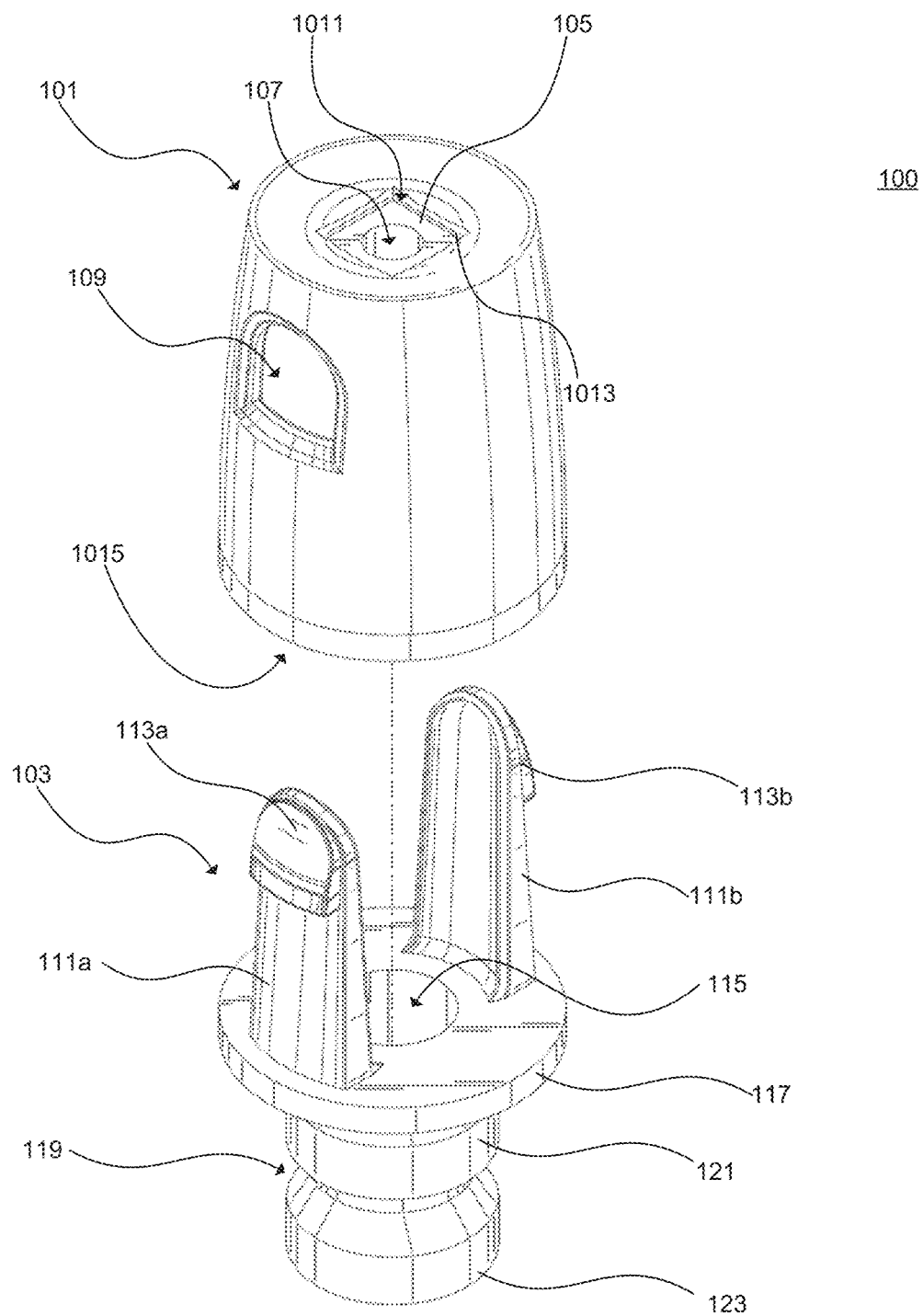
FIG. 1 is a schematic, isometric view of a lure apparatus in accordance with an embodiment of the present technology.

The present technology relates to a lure apparatus for fishing and associated methods. In some embodiments, the lure apparatus includes (1) a head portion; (2) a tail portion; and (3) a weight portion. The head portion and the tail portion are operably, releasably engaged. The head portion has a center opening, enabling a fishing line or wire to pass therethrough. The weight portion is positioned inside the head portion to adjust the weight of the overall lure apparatus. In one embodiment, the head portion has two side openings. In another embodiment, the tail portion has two arms, each of which has an elevated protrusion configured to be positioned in a corresponding one of the two side openings of the head portion. Once the two elevated protrusions are positioned in the corresponding side openings, the two elevated protrusions engage with the head portion and restrain the tail portion from moving relatively to the head portion. A user can push the two elevated protrusions inwardly (e.g., toward the center of the head portion) to remove the elevated protrusions from the side openings (e.g., spring button action) such that the head portion and the tail portion can be disengaged. The present technology enables the tail portion to be quickly released or disengaged from the head portion. By this arrangement, a user can swap or exchange suitable tail portions in a convenient fashion.

In some embodiments, the tail portion can be coupled to a skirt portion that is formed, shaped, and/or colored to imitate a portion (e.g., a body, a tail, etc.) of an aquatic animal. The skirt portion is coupled to the tail portion and can be exchanged by a user. In some embodiments, the two elevated protrusions of the tail portion can be sized, shaped, colored, or otherwise arranged to visually present a portion (e.g., eyes, fins, gill plate, etc.) of an aquatic animal.

In some embodiments, the fishing line can be operably coupled to the tail portion (e.g., by a stopper; see e.g., FIG. 7), and the fishing line can further be coupled to a fishing hook, either directly or by way of an intermediate attachment device such as a swivel connector (e.g., split ring, snap swivel, barrel swivel, ball bearing swivel with split rings, coastlock swivel, crosslock snap swivel, quick clip snap, etc.). In some embodiments, alternatively, the fishing line can be coupled to the head portion, and the fishing line can be further coupled to the fishing hook, directly or by way of a swivel connector.

Another aspect of the present technology includes methods of assembling or disassembling a lure apparatus. In some embodiments, the method can include (1) positioning an optional weight portion of the lure apparatus inside a head portion of the lure apparatus; (2) aligning one or more protrusions of a tail portion of the lure apparatus with one or more corresponding side openings of the head portion; and (3) positioning the one or more protrusions in the one or more corresponding side openings of the head portion. In some embodiments, the method can further include pushing the one or more protrusions of the tail portion out of the one or more corresponding side openings such that the head portion and the tail portion can be disengaged.

Specific details of several embodiments of lure apparatus and associated methods are described below. FIG. 1 is a schematic, isometric view of a lure apparatus 100 in accordance with an embodiment of the present technology. As shown, the lure apparatus 100 includes a head portion 101, a tail portion 103, and an optional weight portion 105. The optional weight portion 105 can be made of any suitable sinking materials such as stainless steel, lead, etc. As shown, the optional weight portion 105 can be positioned inside the head portion 101. In some embodiments, the optional weight portion 105 can be positioned at other locations such as at the outside the head portion 101, or only partially inside the head portion 101. The optional weight portion 105 is configured to adjust the weight of the lure apparatus 100 (such that the lure apparatus 100 can be positioned under water for attracting fish or other aquatic animals). The head portion 101 has a center opening 1011 to accommodate the weight portion 105. In some embodiments, the head portion 101 can be made of a fluorescent or ultraviolet material or coated with a fluorescent or ultraviolet material coating. In some embodiments, the tail portion 103 can be made of or coated with a fluorescent or ultraviolet material.

Figure 5:
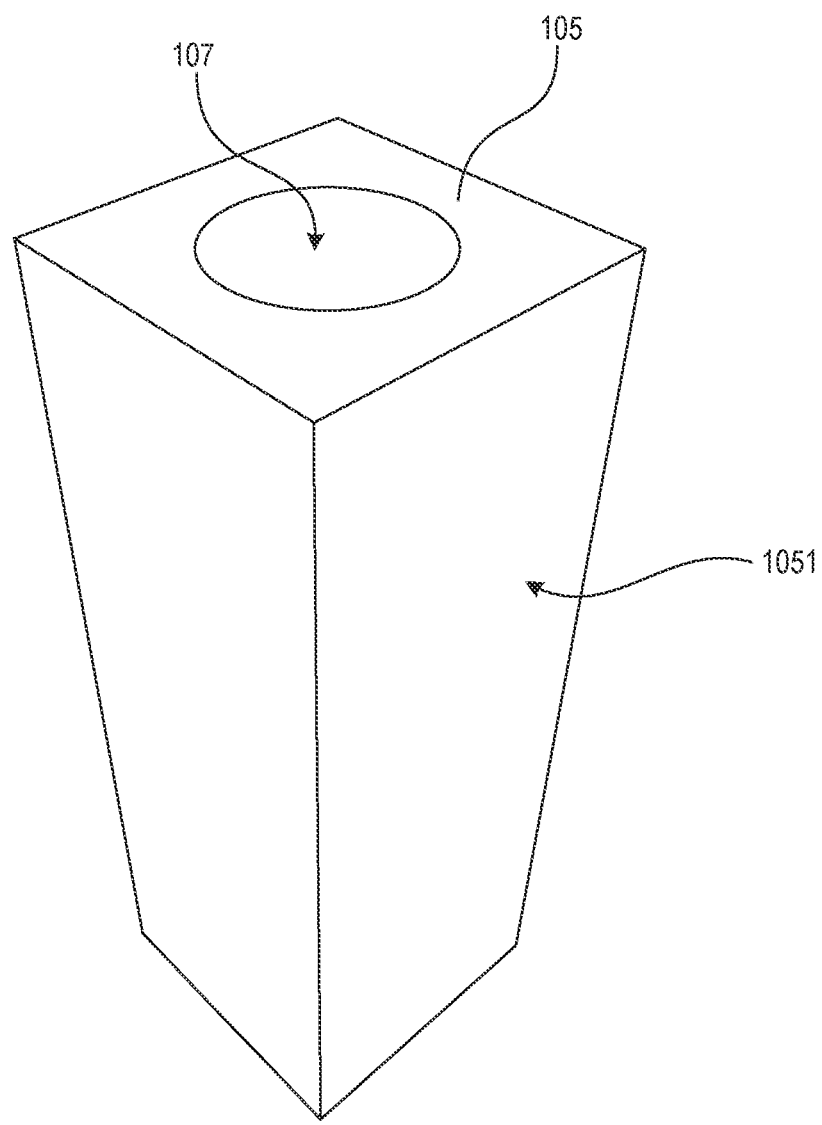
FIG. 5 is a schematic, isometric view of a weight portion of the lure apparatus in accordance with an embodiment of the present technology.

FIG. 5 illustrates an embodiment of the optional weight portion 105. Referring to FIG. 5, the optional weight portion 105 can be formed as a cuboid, with a circular opening 107 in the center thereof. The circular opening 107 is configured to enable a fishing line to pass therethrough. The weight portion 105 includes an outer surface 1051. In the embodiment shown in FIG. 5, the outer surface 1051 of the weight portion 105 includes four side surfaces. In other embodiments, however, the outer surface 1051 can have other numbers (e.g., 1, 3, 5, 6, or more) of side surfaces. In some embodiments, the weight portion 105 can be made of a fluorescent or ultraviolet material or coated with a fluorescent or ultraviolet material.

Referring to both FIGS. 1 and 5, the head portion 101 can have an interior surface 1013 that generally corresponds to or fits the outer surface 1051 of the weight portion 105. By this arrangement, the weight portion 105 can be tightly or seamlessly positioned inside the head portion 101 and held secure from rotation around its longitudinal axis. In some embodiments, the optional weight portion 105 can have other shapes, such as a cylinder, a tube, etc. In some embodiments, the optional weight portion 105 can be coupled to the head portion 101 by adhesives, a latch, a bolt and nut, a clip, and/or other suitable fastener. In some embodiments, the optional weight portion 105 is coupled to the head portion 101 by compression fit against side walls of center opening 1011.

Referring to FIG. 1, the head portion 101 has two side openings 109 (only one is shown in FIG. 1). The tail portion 103 has two arms 111 (shown as 111a, 111b in FIG. 1), each of which has a protrusion 113 (shown as 113a, 113b in FIG. 1) configured to be positioned in a corresponding one of the two side openings 109 of the head portion 101. In one embodiment, the arms are flexible such that they can be flexed toward and away from each other. When the protrusions 113 are respectively positioned in the side openings 109, the head portion 101 and the tail portion 103 are releasably coupled by the flexing action of the arms 111. More particularly, when the two protrusions 113 are respectively positioned in the side openings 109, the two protrusions 113 engage with the head portion 101 and restrain the tail portion 103 from moving relative to the head portion 101. In some embodiments, the tail portion 103 can be further coupled to a fishing line and a fishing hook (e.g., FIG. 7). A user can then use the lure apparatus 100 for fishing. In some embodiments, however, the fishing line and the fishing hook can be coupled to the head portion 101. In other embodiments, a fishing line can pass through circular opening 107 and hole 115 such that the lure apparatus can slide freely along a portion of the fishing line. One or more beads can be placed on the fishing line to act as a stopper and/or to keep a fixed minimum amount of fishing line and/or hook protruding out of the tail portion 103 and into the skirt portion. In one embodiment, the fishing hook protrudes a minimum amount out of the tail portion 103 such that the fishing hook and skirt portion have substantially the same length.

As shown in FIG. 1, the tail portion 103 includes a hole 115 configured to enable a fishing line to pass through. The hole 115 can also be configured to accommodate the optional weight portion 105 (or one or more beads to act as stoppers) when the head portion 101 and the tail portion 103 are engaged. The tail portion 103 includes a platform 117 configured to engage a lower perimeter surface 1015 of the head portion 101, when the tail portion 103 engages the head portion 101. In one embodiment, the tail portion 103 is formed with a recess 119, along with a plurality (e.g., two or more) adjacent protrusions, for example an upper protrusion 121 and a lower protrusion 123, located on the opposite side of the platform 117 from the arms 111. In one embodiment, the head portion 101 has an upper surface 1017 having a cross-sectional area smaller than, the same size as or larger than the cross-sectional area defined by the perimeter of lower surface 1015. In one embodiment, the lower surface 1015 is a void defined by a solid perimeter.

In some embodiments, the tail portion 103 can be coupled to a skirt portion (FIG. 7) that imitates or simulates a portion (e.g., a body, a tail, etc.) of an aquatic animal. The skirt portion can be coupled to the tail portion 103 by the recess 119, the upper protrusion 121, and the lower protrusion 123. For example, the skirt portion can include a skirt protrusion configured to be positioned in the recess 119, such that the upper protrusion 121 and the lower protrusion 123 can engage the skirt protrusion and restrict the skirt protrusion from moving relative to the tail portion 103. More particularly, both the upper protrusion 121 and lower protrusion 123 can be used to engage the skirt portion such that the skirt portion can be securely coupled to the tail portion 103 (e.g., the upper protrusion 121 prevents the skirt portion from moving "upward," whereas the lower protrusion 123 prevents the skirt portion from moving "downward").

In some embodiments, the skirt portion can be exchanged by a user. In some embodiments, the two protrusions 113 of the tail portion 103 can be sized, shaped, colored, or otherwise arranged to visually represent a portion (e.g., eyes) of an aquatic animal. In some embodiments, the tail portion 103 can be made of a fluorescent material.

When the user wants to remove the tail portion 103 from the head portion 101, the user can press or push the two protrusions 113 (e.g., by two fingers) inwardly (e.g., toward the center of the head portion 101). The two protrusions 113 can then be moved out of the side openings 109, and accordingly the head portion 101 and the tail portion 103 can be disengaged. By this arrangement, the user can swap or exchange different tail portions conveniently and quickly.

Figure 2:
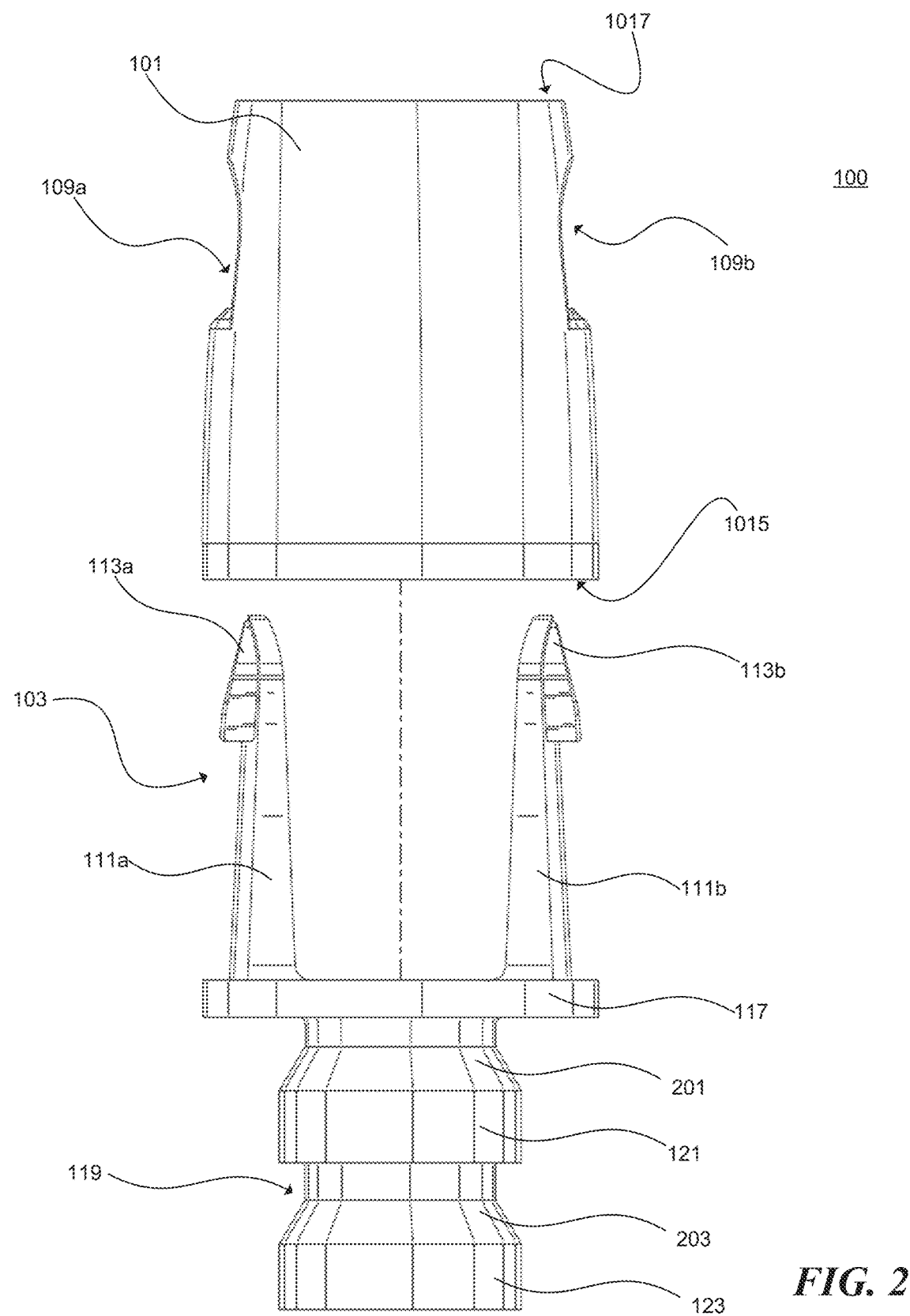
FIG. 2 is a schematic, side view of the lure apparatus in accordance with an embodiment of the present technology.

FIG. 2 is a schematic, side view of the lure apparatus 100 in accordance with an embodiment of the present technology. As shown in FIG. 2, the two side openings 109 (indicated as 109a, 109b in FIG. 2) are positioned at opposite sides of the head portion 101. In other embodiments, however, the two side openings 109 can be located at different locations. For example, one side opening can be located at a location of "zero-degree" whereas the other can be located at a location of "90-degree." For example, a line connecting the location of "zero-degree" to the center of the head portion forms a 90-degree angle with a line connecting the location of "90-degree" to the center of the head portion. In some embodiments, the head portion 101 can have other numbers (e.g., 1, 3, or more) of the side openings 109.

As shown in FIG. 2, the tail portion 103 can be formed with an upper slope 201 adjacent to the upper protrusion 121 and a lower slope 203 adjacent to the lower protrusion 123. In some embodiments, the upper slope 201 and the lower slope 203 are configured to facilitate the connection between the skirt portion and the tail portion 103. In some embodiments, the upper and lower slopes 201, 203 and protrusions 121, 123 enable a user to position the skirt portion at different locations, for example, between the upper protrusion 121 and the platform 117 (e.g., where the upper slope 201 facilitates the connection between the skirt portion and the tail portion 103) or between the upper protrusion 121 and the lower protrusion 123 (e.g., where the lower slope 203 facilitates the connection between the skirt portion and the tail portion 103).

Figure 3:
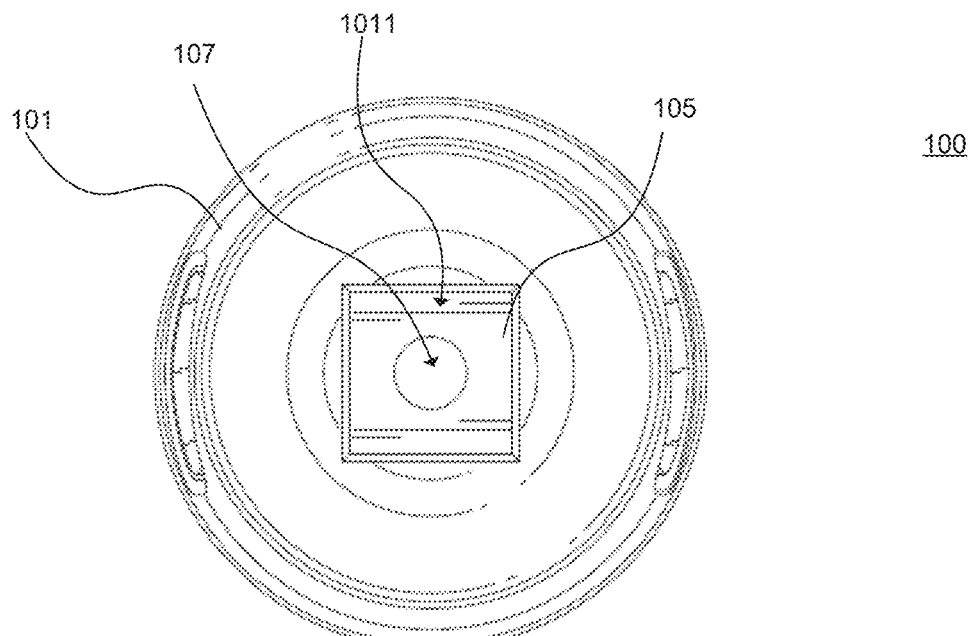
FIG. 3 is a schematic, top view of the lure apparatus in accordance with an embodiment of the present technology.

FIG. 3 is a schematic, top view of the lure apparatus 100 in accordance with an embodiment of the present technology. As shown in FIG. 3, the center opening 1011 has a square shape. In other embodiments, the center opening 1011 can have different shapes such as a circle, oval square or other polygon, corresponding to the shape of the weight portion 105.

Figure 4:
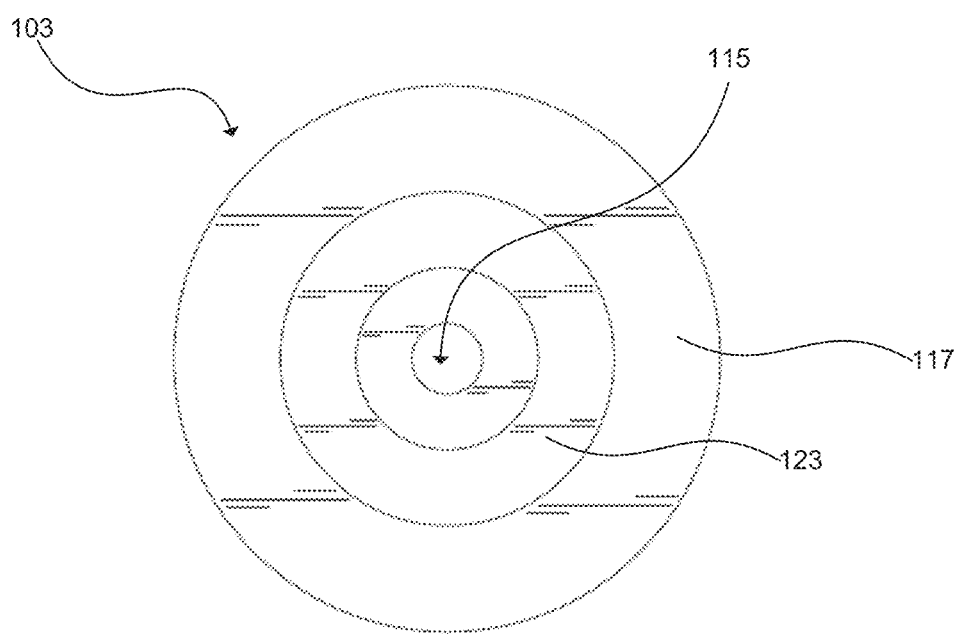
FIG. 4 is a schematic, bottom view of the lure apparatus in accordance with an embodiment of the present technology.

FIG. 4 is a schematic, bottom view of the lure apparatus 100 in accordance with an embodiment of the present technology. In the illustrated embodiment, from the bottom view, the lower protrusion 123 and the platform 117 form concentric circles. In other embodiments, the lower protrusion 123 and the platform 117 can have other shapes, from the bottom view, such as square, rectangle, triangle, hexagon or other polygons.

Figure 6:
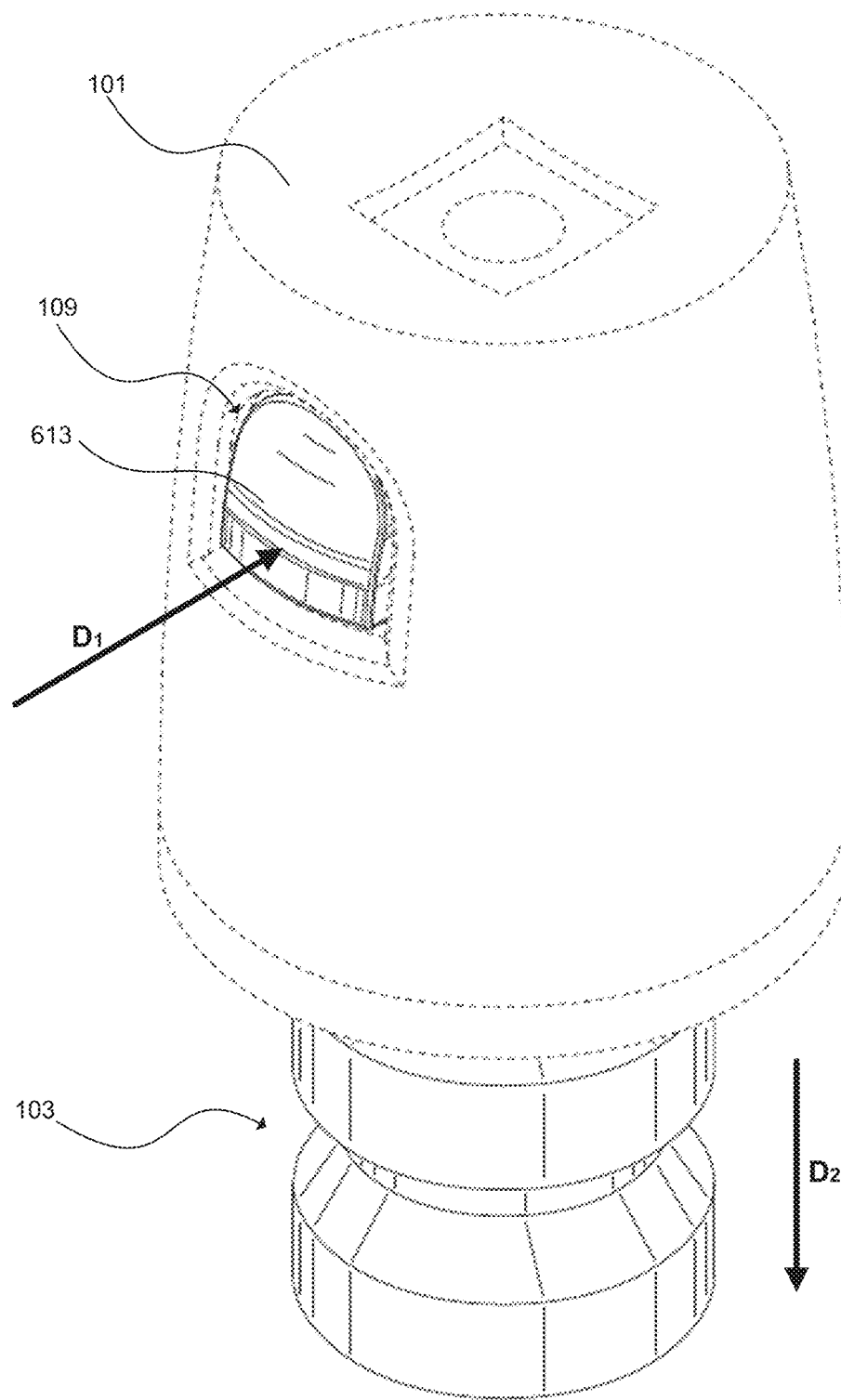
FIG. 6 is a schematic, isometric view of a lure apparatus in accordance with an embodiment of the present technology.

FIG. 6 illustrates an embodiment where the head portion 101 and the tail portion 103 of the lure apparatus 100 are releasably coupled. As shown, a protrusion 613 of the tail portion 103 can be seen from the outside of the head portion 101. When a user wants to remove the tail portion 103 from the head portion 101, the user can first press or push the protrusion 613 in direction $D_1$ (e.g., inwardly toward the center of the head portion 101) and accordingly the protrusions 613 can be moved out of the side openings 109. As a result, the tail portion 103 can be moved in direction $D_2$, and then the head portion 101 and the tail portion 103 can be disengaged.

Figure 7:
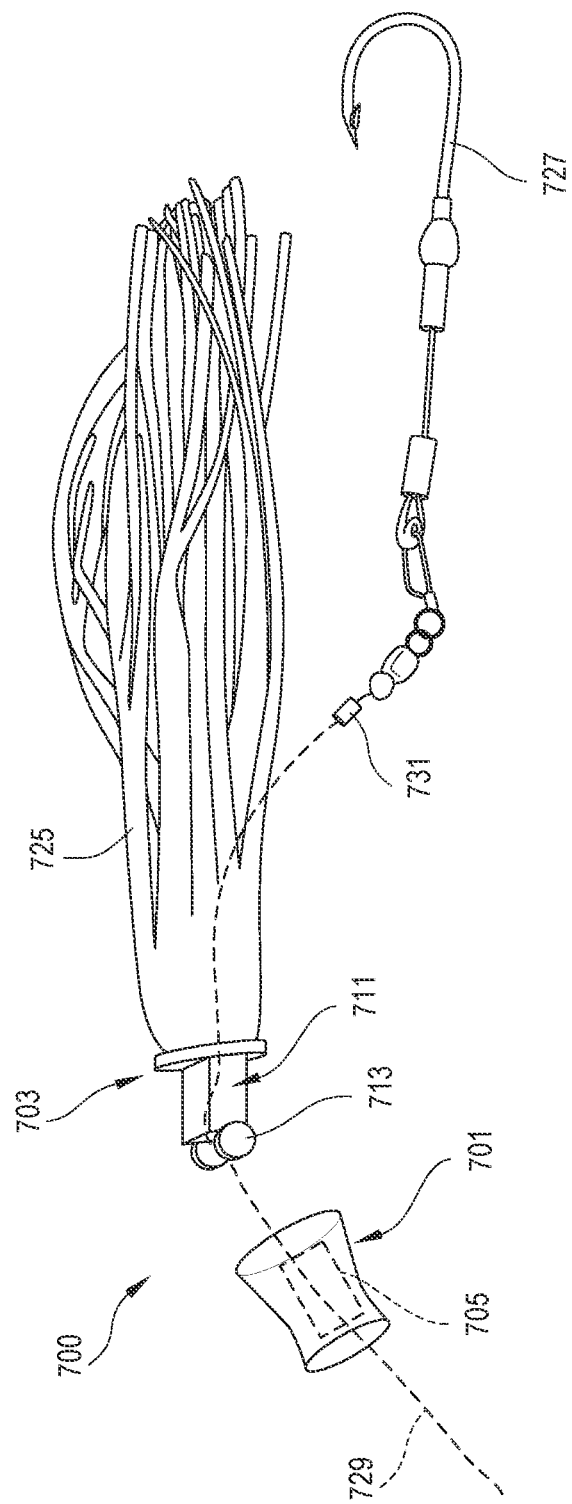
FIG. 7 is a schematic, isometric view of a lure apparatus in accordance with an embodiment of the present technology.

FIG. 7 is a schematic, isometric view of a lure apparatus 700 in accordance with an embodiment of the present technology. The lure apparatus 700 includes a head portion 701, a tail portion 703, an optional weight portion 705, and a skirt portion 725. The optional weight portion 705 is positioned inside the head portion 701 and configured to adjust an overall weight of the lure apparatus 700. The head portion 705 includes at least two arms 711 and two protrusions 713 located at the ends of the arms 711. The tail portion 703 can be coupled (releasable or substantially permanently) to the skirt portion 725. A fishing line 729 can pass through the head portion 701 and the tail portion 703. The fishing line 729 can be coupled to a fixed stopper 731 or the fishing line can include one or more beads (e.g., plastic or polymeric beads) to act as a stopper when the fishing line is pulled. The fishing line can be further coupled to a hook 727, either directly or via an intermediate stopper or swivel. If one or more beads are used, the fishing line is threaded through an aperture in the bead(s) such that the bead(s) ride on the fishing line 729 and are able to press against hook 727, stopper 731 or against a swivel connecting the fishing line 729 to the fishing hook 727. During operation (e.g., fishing), a user can pull the fishing line 729 and then the stopper 731, or one or more beads riding on the fishing line, contacts the tail portion 703. By this arrangement, the user can move the lure apparatus 700 by pulling the fishing line 729 from a direction opposite the fishing hook 727.

Figure 8:
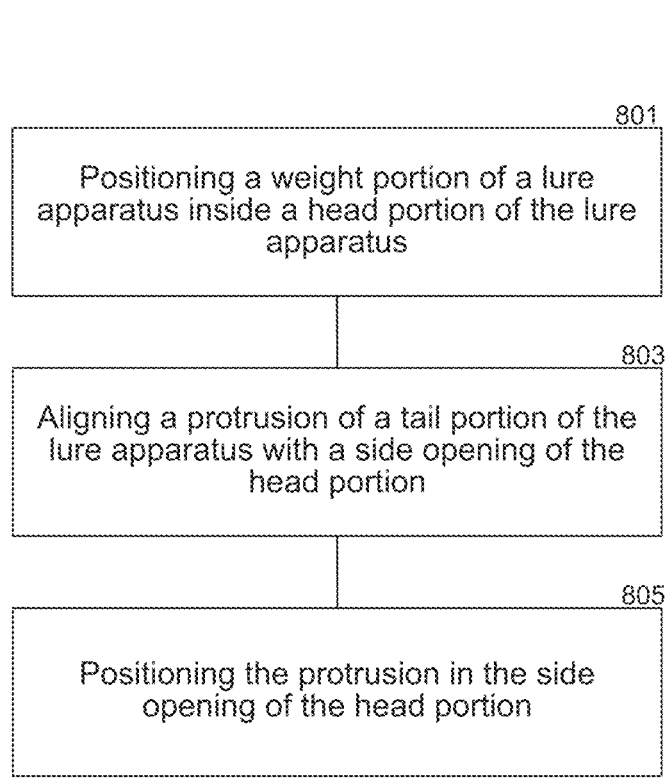
FIG. 8 is a flowchart illustrating a method in accordance with an embodiment of the present technology.

FIG. 8 is a flowchart illustrating a method 800 in accordance with an embodiment of the present technology. The method 800 can be implemented to assemble a lure apparatus such as the lure apparatus 100 or 700 discussed above. The method 800 starts at block 801 by optionally positioning a weight portion of the lure apparatus inside a head portion of the lure apparatus. At block 803, the method 800 continues by aligning at least one protrusion of a tail portion of the lure apparatus with at least one side opening of the head portion. At block 805, the method 800 continues by positioning the at least one protrusion in the at least one side opening of the head portion.

In some embodiments, the method 800 further includes pushing the protrusion of the tail portion out of the side opening such that the head portion and the tail portion can be disengaged. In some embodiments where the tail portion is a first tail portion, the method 800 includes, after the first tail portion disengages the head portion, (1) aligning a second protrusion of a second tail portion of the lure apparatus with the side opening of the head portion; and (2) positioning the second protrusion in the side opening of the head portion. In such embodiments, the first and second tail portions are configured to visually present different types of fishing lures (e.g., different types of aquatic creatures).

In some embodiments, the method 800 includes operably coupling the optional weight portion of the lure apparatus with the head portion of the lure apparatus. In some embodiments, the method 800 includes fixedly coupling or press fitting the optional weight portion of the lure apparatus with or into the head portion of the lure apparatus. In some embodiments, the optional weight portion and the head portion can be coupled by an adhesive, a latch, a clip, a bolt and nut, etc. In some embodiments, at least a portion of the optional weight portion can be positioned outside the head portion. In some embodiments, the optional weight portion is seated inside the center opening 1011 of the head portion 101 and is retained by compression (with or without an adhesive) against interior walls of the center opening 1011.

In some embodiments, the protrusion is located at an end of an arm of the tail portion. In some embodiments, the arm extends from a platform of the tail portion. In some embodiments, the tail portion includes an upper protrusion (e.g., element 121 shown in FIG. 2) and a lower protrusion (e.g., element 123 shown in FIG. 2). In some embodiments, the upper and lower protrusions define a recess (e.g., element 119 shown in FIG. 2) configured to receive a portion of a skirt portion such that the tail portion can be coupled to the skirt portion.

In some embodiments where the arm is a first arm, the protrusion of the first arm is a first protrusion, and the side opening is a first side opening, the method 800 can include (1) aligning a second protrusion of a second arm of the tail portion with a second side opening of the head portion; and (2) positioning the second protrusion of the second arm in the second side opening of the head portion.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. Reference herein to "one embodiment," "some embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

From the foregoing, it will be appreciated that specific embodiments of the present technology have been described herein for purposes of illustration, but that various modifications may be made without deviating from the scope of the invention. The present technology is not limited except as by the appended claims.

I claim:

1. An apparatus for fishing, comprising:
   a head portion having first and second side openings;
   an optional weight portion positioned inside the head portion and configured to adjust a weight of the apparatus; and
   a tail portion configured to releasably engage the head portion;
   wherein the tail portion has first and second arms, each having a protrusion at their distal end configured to be positioned in the first and second side openings, respectively.

2. The apparatus of claim 1, wherein the head portion has a substantially cylindrical, conic or truncated conic shape.

3. The apparatus of claim 1, wherein the first and second side openings are positioned on opposing sides of the head portion.

4. The apparatus of claim 1, wherein the tail portion includes a platform, and wherein the first and second arms extend perpendicularly from the platform.

5. The apparatus of claim 4, wherein the platform is configured to engage a lower surface of the head portion.

6. The apparatus of claim 5, wherein the lower surface of the head portion has a cross-sectional shape and area substantially the same as a cross-sectional shape and area of an upper surface of the head portion.

7. The apparatus of claim 1, wherein the first and second protrusions have a perimeter shape of a square, rectangle, rounded rectangle, circle, oval, ellipse, or a segment of a rounded rectangle, circle, oval, or ellipse.

8. The apparatus of claim 4, wherein the tail portion has an upper protrusion and a lower protrusion on an opposing side of the platform from the first and second arms, and wherein the upper protrusion and the lower protrusion have a void therethrough.

9. The apparatus of claim 8, further comprising a skirt portion coupled to the upper protrusion and the lower protrusion of the tail portion.

10. The apparatus of claim 9, wherein the tail portion includes an upper slope adjacent to the upper protrusion and a lower slope adjacent to the lower protrusion.

11. A method of assembling an apparatus for fishing, the method comprising:
    positioning an optional weight portion of the apparatus inside a head portion of the apparatus, wherein the apparatus has a tail portion;
    aligning a protrusion of an arm of the tail portion of the apparatus with a side opening of the head portion, wherein the protrusion is at a distal end of the arm; and
    positioning the protrusion in the side opening of the head portion;
    wherein the protrusion of the tail portion is shaped to visually present a portion of an aquatic animal.

12. The method of claim 11, further comprising pushing the protrusion of the tail portion out of the side opening so as to disengage the head portion and the tail portion.

13. The method of claim 11, wherein the tail portion is a first tail portion, and wherein the method further comprises:
    after the first tail portion disengages the head portion, aligning a second protrusion of a second tail portion of the apparatus with the side opening of the head portion; and
    positioning the second protrusion in the side opening of the head portion.

14. The method of claim 11, wherein the head portion has a substantially cylindrical, conic or truncated conic shape, and wherein the tail portion includes a platform, and wherein the arm extends perpendicularly from the platform.

15. The method of claim 14, wherein the arm is a first arm, and wherein the protrusion of the first arm is a first protrusion, and wherein the side opening is a first side opening, and wherein the method further comprises:
    aligning a second protrusion of a second arm of the tail portion with a second side opening of the head portion; and
    positioning the second protrusion of the second arm in the second side opening of the head portion.

16. An apparatus for fishing, comprising:
    a head portion having first and second side openings;
    an optional weight portion positioned inside the head portion and configured to adjust a weight of the apparatus;
    a tail portion configured to releasably engage the head portion;
    a fishing line passing though the head portion, the weight portion, and the tail portion; and
    a stopper coupled to the fishing line;
    wherein the tail portion has first and second arms, each having a protrusion at their distal end configured to be positioned in the first and second side openings, respectively; and
    wherein the stopper is positioned to contact the tail portion so as to restrain a movement of the tail portion in response to a pulling of the fishing line.

17. The apparatus of claim 16, wherein the first and second side openings are positioned on opposing sides of the head portion.

18. The apparatus of claim 16, wherein the head portion has a substantially cylindrical, conic or truncated conic shape, and wherein the tail portion includes a platform, and wherein the first and second arms extend perpendicularly from the platform.

* * * * *